United States Patent [19]

Baumann

[11] 4,305,058
[45] Dec. 8, 1981

[54] FUEL AND WEAR SAVING DEVICE

[76] Inventor: Charles W. Baumann, R.D. 1, Box 379, Sewickley, Pa. 15143

[21] Appl. No.: 58,751

[22] Filed: Jul. 19, 1979

[51] Int. Cl.³ .................. B60Q 1/46; H01H 35/14
[52] U.S. Cl. ............................ 340/52 H; 200/61.47; 200/189; 200/223; 340/62; 340/669; 340/693
[58] Field of Search .............. 340/52 H, 62, 669, 65, 340/689, 693; 200/61.45 R, 61.47, 61.52, 61.83, 189, 215, 223, 236

[56] References Cited

U.S. PATENT DOCUMENTS

| | | | |
|---|---|---|---|
| 1,519,079 | 12/1924 | Whiting | 200/61.47 |
| 2,453,783 | 11/1948 | Claypool | 200/61.47 X |
| 3,564,531 | 2/1971 | Burgin | 200/61.47 X |
| 3,627,962 | 12/1971 | Chapman | 200/223 |
| 3,668,675 | 6/1972 | Joens et al. | 340/65 X |
| 3,701,093 | 10/1972 | Pick | 340/52 H |
| 3,715,533 | 2/1973 | Seaton | 340/65 X |
| 3,763,484 | 10/1973 | Byers | 340/52 H X |
| 3,898,613 | 8/1975 | Nahikian et al. | 340/52 H X |
| 3,946,359 | 3/1976 | Henderson | 340/52 H |

FOREIGN PATENT DOCUMENTS 113756  4/1945  Sweden ..................... 200/223

Primary Examiner—John W. Caldwell, Sr.
Assistant Examiner—Joseph E. Nowicki
Attorney, Agent, or Firm—Buell, Blenko, Ziesenheim & Beck

[57] ABSTRACT

An inertial switch device, for installation in an electrical circuit of an automotive vehicle, to signal excessive rates of acceleration, deceleration and turning for the purpose of preventing abusive driving which wastes gasoline. The switch device comprises a housing having a closed chamber with a concave bottom surface containing a globule or drop of mercury and a plurality of circular contacts supported therein so that the drop of mercury successively contacts them when a momentum force causes the drop of mercury to climb a side of the dish. The circular contacts are of increasingly larger diameter as the drop climbs the side of the dish with increasing inertia and are arranged in circuit-closing relation to a warning signal device, either audible or visible.

3 Claims, 5 Drawing Figures

U.S. Patent
Dec. 8, 1981
4,305,058
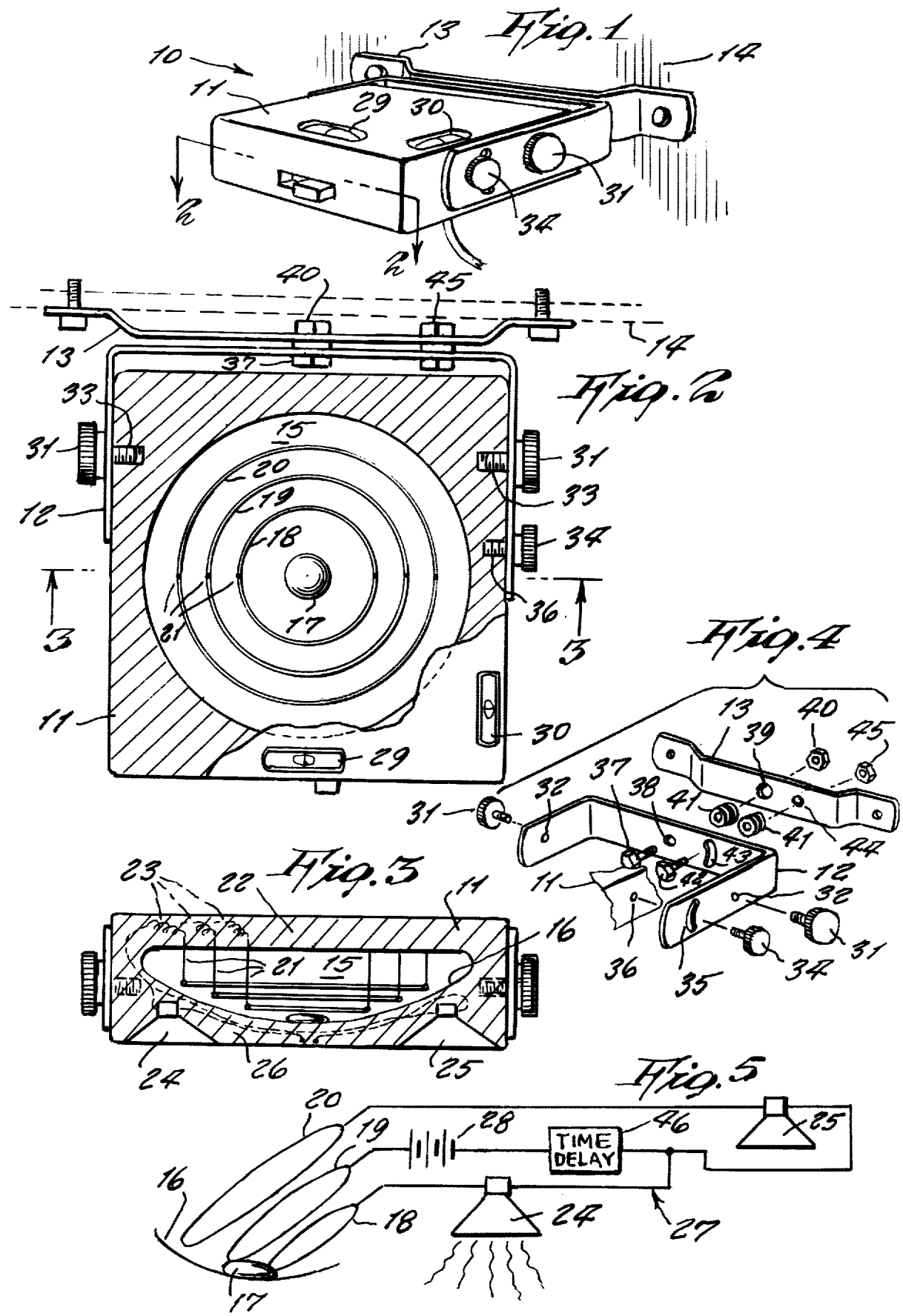

FUEL AND WEAR SAVING DEVICE

This invention relates generally to inertial switch devices arranged in electrical circuitry on automotive vehicles.

It is well known, that excessively rapid changes in the speed of operation of an automotive vehicle causes a waste of fuel, and at the same time, causes increased wear on an engine, tires and other parts. There is, accordingly, a need, at this time of gasoline shortage, and increasing costs of automobile maintenance, for preventing any unnecessary waste of these essential vehicle parts.

Therefore, it is a principal object of the present invention to provide an inertial switch device that can be readily installed in an electrical circuit of any automotive vehicle, and which will serve to call the attention of the motorist when he accelerates, decelerates or turns at excessive rates.

A further object is to provide an inertial switch device, which is simple in design, inexpensive to manufacture, rugged in construction, and readily installed on an automotive vehicle.

These, and other objects, will be readily evident, upon a study of the following specification, and of the accompanying drawings, wherein:

FIG. 1 is a perspective view of a preferred embodiment of the invention, shown as installed on an automobile fire wall;

FIG. 2 is a horizontal sectional view, on a plane through line 2—2 of FIG. 1;

FIG. 3 is a cross-sectional view, taken on line 3—3 of FIG. 2;

FIG. 4 is an exploded perspective view of the mounting bracket details, and

FIG. 5 is a simplified electrical diagram showing the manner of use of the inertial switch comprising my invention.

Referring to the drawings, the reference numeral 10 represents an inertial switch device embodying my invention, wherein there is a housing or case 11, adjustably mounted in a U-shaped bracket 12, that is adjustably supported on a stationary bracket 13, by which the device is mounted on a fire wall 14 of an automotive vehicle.

As shown in FIGS. 2 and 3, the housing or case is made of a molded hard plastic material capable of providing electrical insulation. The housing includes a sealed, circular, central chamber 15, having a bottom surface 16 of a concave contour similar to that of a dish. A globule or drop of mercury 17 is disposed at the low point of the chamber and is free to roll upwardly in all directions upon this surface. Three circular electrical contacts 18, 19 and 20 are contained within the chamber, each contact comprising a circular steel or copper wire ring and coaxially disposed with respect to a common axis through the center of the chamber 15 and positioned concentrically inside each other as shown in FIG. 2. Each ring is spaced the same specific distance above the dished bottom surface 16 on a line perpendicular thereto (as shown in FIG. 3), so that the mercury drop 17 can roll therebeneath, and, at the same time, contact the rings while rolling by as shown diagrammatically in FIG. 5. The mercury drop is sufficiently large that it will contact any two adjacent rings at the same time. The rings are stationarily supported in position by means of pairs of diametrically arranged rods 21 extending vertically upward and at their upper ends, supported by being molded in the top wall 22 of the housing, and, at the same time, being electrically connected to wires 23, also imbedded in the top wall. The wires 23 are connected to a buzzer 24 and lamp 25, molded in a bottom wall 26 of the case, and exposed on their underside, in order to emit a sound that can be heard, and a light that can be seen by a motorist. The buzzer and lamp are in an electrical circuit 27, that includes the three rings, the center one of which is of a different polarity from the other two rings, so that, whenever two adjacent rings are contacted at the same time by the drop of mercury 17, the ciruit is closed, through the vehicle battery 28. At a lower excessive rate of change of speed, the buzzer 24 sounds. At a greater rate of change of speed the lamp 25 is lighted.

A time delay unit 46 connected in the circuit 27 serves to delay the warning for about two seconds, in order not to warn of any minimal momentum, such as may occur at other times of the vehicle operation.

A pair of spirit levels 29 and 30, are imbedded in the case, along planes at right angles to each other, so as to adjust the case easily into a level position wherein the drop of mercury 17 necessarily collects at the center of the chamber bottom surface.

The case is thus adjustable in the two planes, by means of structure shown in FIG. 4. The case is pivotable about screws 31, through aligned holes 32, on opposite end legs of the U-shaped bracket 12, and in threaded holes 33 of the case. A lock screw 34 extends through an arcuate slot 35 of one end leg of the bracket 12, and is screwed in a threaded hole 36 of the case, and serves to lock the case respective to the bracket in a selected adjustment. The U-shaped bracket 12 is pivoted on a bolt 37, extending through a hole 38 of bracket 12, and a hole 39 of the stationary bracket 13, the bolt being fitted with nut 40 on its end. Spacers 41 may be provided between the brackets, on the bolt. A lock screw 42, through an arcuate slot 43 of bracket 12 and a hole 44 of bracket 13, is fitted with a nut 45, and serves to lock the brackets respective to each other, in a selected position.

In operative use, it will be apparent that when properly adjusted in position, my inertial switch device 10 registers excessive rates of acceleration, stopping or rounding of a curve, so as to warn a motorist to desist.

While various changes may be made in the detail construction, it is understood that such changes will be within the spirit and scope of the present invention, as is defined by the appended claims.

What I claim is:

1. The combination of an inertial switch device with audible signal means and visible signal means wherein said inertial switch device comprises a casing having a closed circular chamber, the bottom surface of which is of a smooth concave surface, a drop of mercury disposed in the low portion of said concave surface and arranged to climb and descend the surface in all directions responsive to momentum developed therein, a central circular contact member, an adjacent circular contact member of smaller diameter and an adjacent circular contact member of larger diameter, said contact members being arranged in coaxial concentric relation to each other and disposed uniform distances from said concave surface, said drop of mercury being of such thickness as to contact each of said circular contact members as it passes under it in climbing and descending the concave surface and of a diameter such as to bridge two adjacent ones of said circular contact members, wherein said audible signal means and said visible signal means are embodied in said casing, and wherein electric circuit means including a source of voltage has a terminal of one polarity connected to said central circuit contact member and a terminal of opposite polarity connected to said audible signal means and to said visible signal means, said signal means being selectively energized depending upon whether the drop of mercury bridges the central circular contact member and the adjacent circular contact member of smaller diameter or the central circular contact member and the adjacent circular contact member of larger diameter.

2. The combination according to claim 1, wherein said electric circuit means includes a time delay means so connected as to inhibit the response of either of said signal means to closure of said circuit means.

3. The combination according to claim 1, wherein said casing is generally of flat rectangular shape carrying spirit levels therein at right angles to each other for registering a level position of said casing in two different planes, and bracket means pivotally supports said casing for swiveling movements in two different planes to enable the casing to be adjusted into a level position, and screw means for locking said casing to said bracket means when a level position is attained thereby.

* * * * *